United States Patent Office 3,368,588
Patented Feb. 13, 1968

3,368,588
SMOOTH PRECISION DIMENSIONAL BODIES OF VITREOUS MATERIAL AND METHOD AND APPARATUS FOR PRODUCING THE SAME
Otto Meyer, Wohlen, near Bern, Switzerland, assignor to Ronor S.A., Bern, Switzerland, a Swiss corporation
Continuation-in-part of application Ser. No. 357,608, Apr. 6, 1964. This application Aug. 17, 1966, Ser. No. 572,950
Claims priority, application Switzerland, Apr. 5, 1963, 4,402/63; Jan. 24, 1964, 905/64; Aug. 18, 1965, 11,626/65
9 Claims. (Cl. 138—178)

ABSTRACT OF THE DISCLOSURE

A method and apparatus for forming an accurately dimensioned surface on a vitreous body which includes placing a vitreous body surface having the approximate dimensions desired inside an accurately dimensioned metallic mold and maintaining the surface of the vitreous body to be accurately dimensioned in contact with the accurately dimensioned mold surface while both have a temperature above the upper limit of the transformation temperature of the vitreous material and cooling both the mold and the vitreous body while they remain in contact to a temperature below the upper limit of the transformation range of the vitreous material.

---

The present application is a continuation-in-part application of copending U. S. patent application Ser. No. 357,608, filed Apr. 6, 1964, now abandoned.

The present invention relates generally to vitreous materials and to a method of forming vitreous materials. More particularly, the present invention relates to an improved process of forming an improved body of vitreous material to provide thereon a smooth accurately dimensioned and/or conditioned surface and to a smooth accurately dimensioned and/or conditioned vitreous body produced by the improved process.

The formation of bodies of a vitreous material having accurately defined dimensions presents a difficult technical problem where a high degree of precision is required. Where tolerances of the order of 0.001 mm. must be maintained, the final stage of accurately shaping a vitreous body generally consists of a grinding step, followed in some cases by polishing. Thus, for example, glass parts used for the assembly of chemical apparatus such as pistons, fractionating columns, coolers, stoppers, taps and stop cocks or the like are ground over their connecting areas to form standardized, usually conical inner and outer seating surfaces by means of which these parts can easily be inserted, removed and replaced.

Precision glass grinding, however, is a relatively costly process and the glass surfaces ground to the necessary precision no longer have the original smoothness of the solidified glass surface but are fairly rough unless grinding has been followed by a polishing operation which again increases the cost. This roughness makes them more susceptible to attack by various chemicals with the result that adjoining surfaces may stick together, for example, under the action of strong alkalies. Also, these surfaces are more adsorbent to foreign substances than an unworked glass surface, and in many cases it is not possible to clean the ground surfaces thoroughly after use. Moreover, it is impossible to produce a geometrically accurate conical ground surface on hollow glass bodies. As a result of vibration and of imbalance due to uneven wall thickness of the glass, the grinding process can only produce polygonal surfaces that are approximately round. This lack of accuracy enables vapors to diffuse therethrough and, combined with the surface roughness produced by grinding, this frequently leads to the ground surfaces jamming together. To overcome these difficulties, the ground surfaces are usually coated with a special lubricating and sealing substance such as vacuum grease before they are fitted together. However, these substances may be dissolved out by solvents or solvent vapors in the apparatus so that they become ineffective, and the reagents in the apparatus are contaminated.

In addition, special hot forming methods have been developed for the production of precision formed inner surfaces in hollow glass bodies for special purposes, e.g., for flow meters, hypodermic syringes and the like (see, e.g., British Patent specification No. 573,235 and German Auslegeschrift No. 1,074,229). However, these methods find no application in the formation of surfaces where two parts of the kind mentioned above fit together, partly due to the fact that the grinding process is indispensable for the formation of the corresponding outer surfaces because no other forming process gives the same degree of accuracy which is necessary for this and other purposes.

It is therefore an object of the present invention to provide bodies of vitreous material with smooth, precision formed outer surfaces which have a precision at least as good as the ground surfaces hitherto produced but which do not have the disadvantages indicated above, such as high production costs and roughness of the glass surface.

Another object of the invention is to provide improved bodies of vitreous material which are conditioned by effecting tempering, smoothing, hardening, relieving undesired strains or introducing a predetermined strain.

Other objects of the present invention will be apparent from the detailed description and the claims to follow when read in conjunction with the accompanying drawing, wherein:

Figure 1:
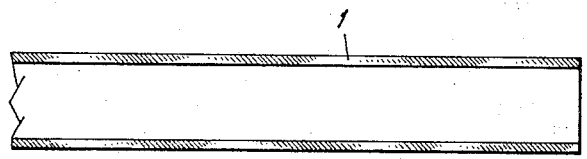
FIG. 1 is a fragmentary vertical sectional view of a glass tube which is to be accurately formed.

It has been found that in general the herein disclosed surprisingly accurate sizing and conditioning effects are achieved by cooling a vitreous body, such as a glass tube, or part thereof, which has been preformed to approximately the final dimensions and which has its outer surface in contact with an accurately dimensioned surface of a metal die, together with said die, from a temperature above the transformation range of the vitreous material, and preferably from a temperature above the transformation range and below the working range of the vitreous material, to a temperature within or below the transformation range.

It has further been found that the above-mentioned process is appropriate not only to effect sizing of outer surfaces on preformed bodies or parts thereof composed of vitreous material, but also to condition the vitreous bodies and surfaces, the dimensional precision of which may already be sufficient, with the said conditioning leading to an improvement of the said bodies and surfaces by tempering, hardening, smoothing, relieving undesired strains or introducing predetermined desirable strains.

The present invention also relates to apparatus for carrying out said process and said apparatus is characterized by a metal die, preferably having means for heating said die, and, if desired, having means for cooling said dies and/or the vitreous article contained therein.

The sizing and/or improving effect of the present invention can be achieved in many instances by means of a relatively simple device the main component of which consists of a heatable and, if desired, coolable sizing or mold. Other sizing apparatus suitable for use in the process of the present invention will be described hereinafter.

In each instance, the mold consists of a metal or alloy having a thermal co-efficient of expansion higher than that of the vitreous material to be treated and meeting the requirements as to heat resistance, and resistance to oxidation and the like. Useful for this purpose are, for instance, tools of chrome-plated steel, chrome-plated copper, as well as of special alloys such as "Nimonic" (registered trade name for a high nickel-chromium iron alloy) and "Inconel" (registered trade name for a high nickel-chromium iron alloy).

The process of the present invention is initiated by bringing the outer surface of the body to be shaped to size and/or conditioned in contact with the surface of an accurately formed mold or die, said body as well as said die being brought in the zone of contact to a temperature above the upper limit of the transformation range of the vitreous material being shaped, and preferably to a temperature between the transformation range and the working range of the vitreous material.

Regardless of the way in which said initial conditions of the process have been attained, the essential element for achieving the desired effects is in each case the following step of simultaneously cooling the die and the body or part thereof being treated with the surface thereof to be accurately sized and/or conditioned in contact with the accurately dimensioned surface of said die, from said temperature above the transformation range to a temperature within or below the transformation range of the vitreous material. Under the foregoing conditions, the viscosity of the vitreous material runs through a range in which the body being shaped, although sufficiently solid to allow the development of pressure, is still plastic enough to permit slight deformations under the pressure exerted by the die or other force and within the limited time available.

According to one embodiment of the present invention, the objects of the invention are attained by introducing a vitreous body or a part thereof, which has been preformed at least to the approximate dimensions desired and heated to a temperature in the lower working range, into a die heated to a temperature in the upper transformation range so that when contact is established between the body and the die an exchange of heat between the body (or parison) and the die (or mold) occurs which results in an equalization of temperature with the result that both soon have a temperature below the working range and above the transformation range of the vitreous material after which the foregoing cooling step is performed. Such a process is especially appropriate when the outer surface of a hollow parison is to be brought into contact with the die surface by means of internal gas pressure.

It has also been found that the objects of the present invention can be achieved in other ways. Thus, at the moment of contact with the die, the body of vitreous material can have a temperature equal to or lower than that of the preheated die. Besides, under certain conditions, the mold and the body of vitreous material need not be heated prior to being brought into contact, but the mold can be heated together with the body being formed from room temperature to the required temperature above the transformation range of the vitreous material.

The preforming or prefinishing of the body of vitreous material to the approximate final measurements is effected by one of the usual hot-forming processes. If the body is one of rotational symmetry, it can be prefinished by heating it to a temperature in the working region and then working it on a lathe with the aid of suitably formed rollers. The prefinished article should be as close as possible to the final measurements. The tolerances of the prefinished articles with respect to the final accurate measurements should generally be of the order of 0.01 mm., a degree of accuracy that can just be achieved by conventional hot-forming processes. In some cases, slightly greater tolerances are permissible. Thus, hollow bodies that can be expanded slightly by inner gas pressure, e.g., by blowing, as soon as they have been introduced into the mold for the final calibration step can be made from preformed bodies which fall short of the final measurement by about 0.1 mm. or more. The outer surface of such hollow bodies is then out of contact with the surface of the mold until it is brought into contact by the blowing process. When the preform has large deviations from the desired final dimension, sizing to the required precision can in some cases be carried out in stages by repeatedly applying the instant novel process and, if desired, by using a series of molds having different sizes or calibres.

In the first embodiment, a body which has been preformed to approximately the final measurements before being introduced into the mold is heated to a temperature in the lower working range of the vitreous material of which it is formed. The conditions which determine the temperature range to be observed, i.e., its upper and lower limit, are that the preformed body should on the one hand have sufficient dimensional stability to be introduced into the mold without change of shape, e.g., by the action of gravity, but on the other hand it should be capable of sufficient plastic deformation to enable it to be shaped to its final shape as required or to enable it to undergo slight expansion under the effect of internal gas pressure, where required. For example, if the preformed body when introduced into the die is slightly below the required measurements, it should be heated to a temperature such that it can be brought readily into contact with the accurately dimensioned surface of the mold, as by expanding under internal gas pressure. These conditions are fulfilled in the lower working range of the particular material, corresponding to a dynamic viscosity of about $10^6$ to $10^8$ poises. Unwanted deformation of the preformed body heated to this region may also be countered by suitable arrangements, e.g., by supporting the body in the horizontal position and rotating it until after it has been introduced into the synchronously rotating sizing mold. Heating the body to the necessary temperature is preferably carried out in the same working stage as the preforming to the approximate measurements. If this is done on a lathe, this at the same time provides the means for the rotation of the heated preformed body and mold.

At the moment of introduction of the foregoing preformed body into the sizing mold the latter should be heated to a temperature in the upper transformation region of the vitreous material. The whole transformation region corresponds by definition to a dynamic viscosity in the region of about $10^{12}$ to $10^{15}$ poises. The upper temperature limit of the mold is determined by the fact that if the temperature of the mold is too high, the body of vitreous material will stick to the surface of the mold, which impairs the formation of a smooth, accurate surface. If the temperature of the mold is too low, with regards to the temperature of the body being introduced (where the mold is not provided with other heating means), the desired accuracy of reproduction is again not achieved because the temperature of the body being formed and the mold are not raised to a temperature above the upper transformation temperature or the material solidifies too quickly after it has been brought into contact with the mold. If the mold is provided with external heating means, however, the temperature of the mold and the body at the time of insertion of the body into the mold is not critical, as will be explained in detail hereinafter.

Where the bodies to be finally shaped are hollow, the preformed body may be smaller than the final measurements by an amount of the order of 0.1 mm., and after it has been introduced in the plastic state into the heated mold it is brought into contact with the forming surface of the mold by gas pressure. Under the given tolerances and the given temperature of the vitreous material, an internal excess pressure of about 1 to 2 atmospheres above atmospheric pressure is sufficient for this purpose. The simplest compressed gas to be used for the purpose is air, although other gases may also be used. To produce the necessary gas pressure, it is advisable to keep one end of the hollow body closed and connect a source of pressure to the other end. Tubular hollow bodies open at both ends are preferably not opened at their front end until after the outer surface has been formed, and the end may then be opened, e.g., by melting or cutting off the closed end.

Figure 6:
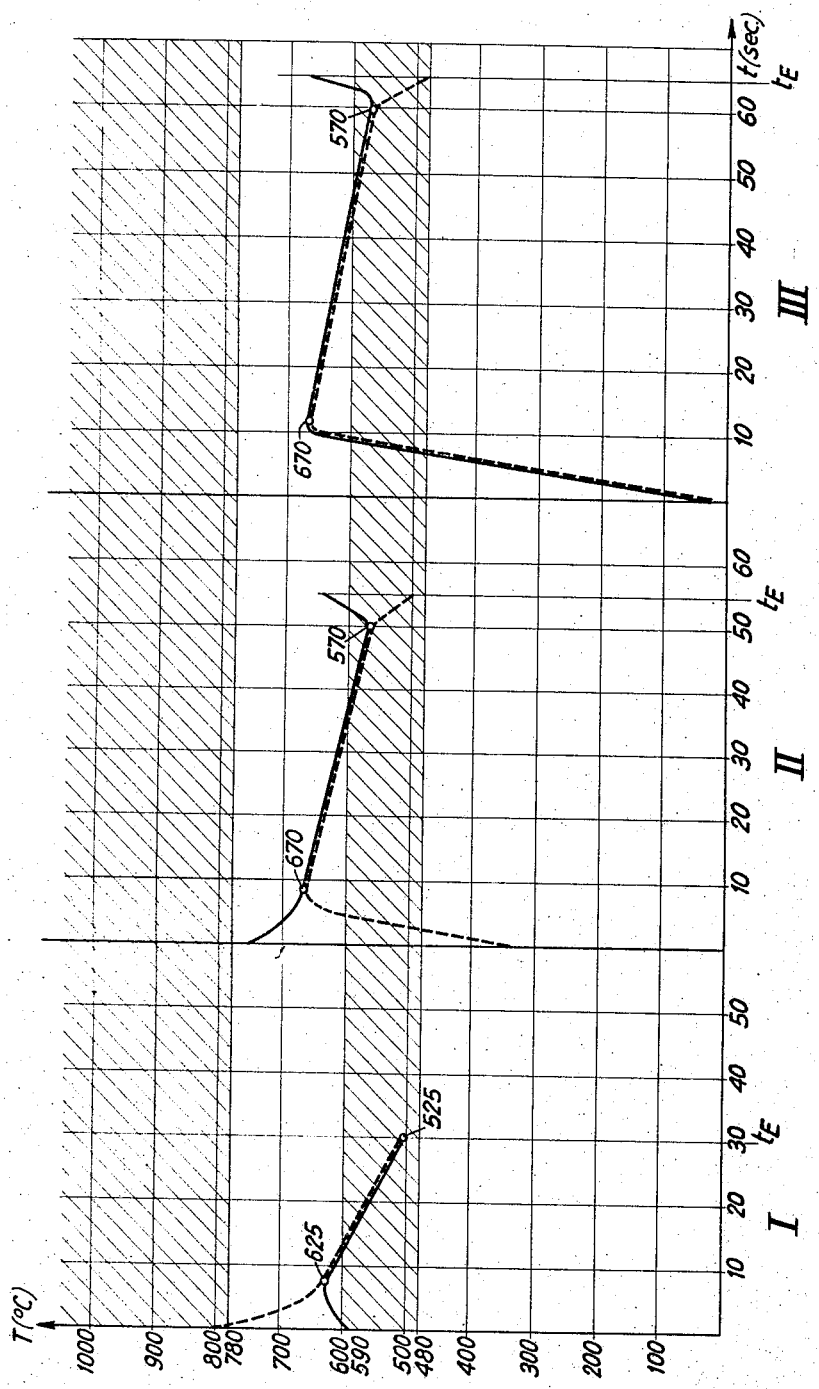
FIG. 6 is a temperature-time graph illustrating the temperature and time relationship of three specific embodiments of the present invention.

The preformed body is left in the sizing mold while cooling is effected for a certain time, the duration of which depends on the size, shape and material properties of the body and of the mold, until the temperatures of both equalize at a temperature above the transformation temperature of the material of the body being shaped and until both are cooled below the upper limit of the transformation range, which generally is for a period of between about 10 to 30 seconds, if no positive cooling means is used. In the embodiment shown in Graph I of FIG. 6, owing to the higher temperature to which the body is heated, the body being formed gives off heat to the mold which therefore for a short time assumes a higher temperature in the zone of its forming surface but loses heat to the outside and the overall effect is that it cools down. This cooling may, if desired, be accelerated by a cooling system associated therewith.

When the sizing mold (and with it also at least the outer zone of the body being formed) has cooled down to a temperature in the transformation region of the vitreous material, the vitreous article is removed from the mold. Premature removal impairs the precision of the finished article, either because the article is still too soft and therefore deformed under the effect of mechanical stress when it is removed, or because the sizing process is not completely finished. A lower temperature limit for the removal of the article without reheating can be determined by the fact that since the co-efficient of thermal expansion of the vitreous material is smaller than that of metallic materials used for the molds, at least below the transformation point of the vitreous material, the article would on further cooling be jammed tight by the more strongly contracting tool, which in extreme cases might lead to fracture of the sized article or permanent deformation of the mold. When an article has been jammed in the tool under these conditions, its removal without destroying it can only be achieved by reheating the tool, and, if desired, by simultaneous cooling of the body being formed.

The absolute values of temperatures employed in the process according to the invention, which are given above, as usual, as functions of the dynamic viscosity of the vitreous material comprising the body being sized, can be derived from the appropriate tables and graphs. For example, for the usual apparatus glass Duran 50 (trademark for a boro-silicate type glass) the transformation region lies between about 500° C. and 600° C., whereas the working or processing range begins at about 780° C.

Figure 5:
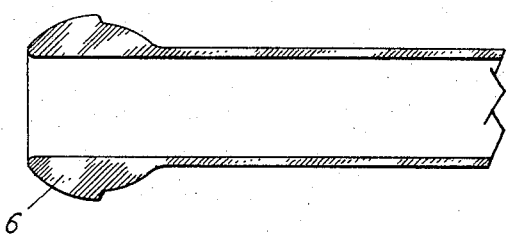
FIG. 5 is a fragmentary vertical sectional view of a vitreous hollow body having a spherical end section produced in accordance with the present invention.

An example illustrating the first embodiment of the invention will be described below with reference to the accompanying drawing, in which FIGURES 1 to 4 show four separate stages in the production of a smooth, conical accurately dimensioned outer surface at the end section of a cyclically symmetrical hollow body of apparatus glass "Duran 50," and FIGURE 5 shows a hollow body of spherical end section produced by the same method. It will be understood, however, that FIGURES 1–3 relate only to the preforming of the body to approximate final dimensions, and that the preforming operation is not a part of the present invention.

EXAMPLE 1

Figure 2:
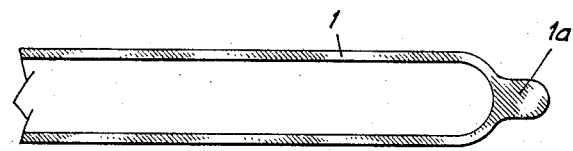
FIG. 2 is a fragmentary vertical sectional view of the tube of FIG. 1 having the end thereof which is to be accurately formed closed by melting.
Figure 3:
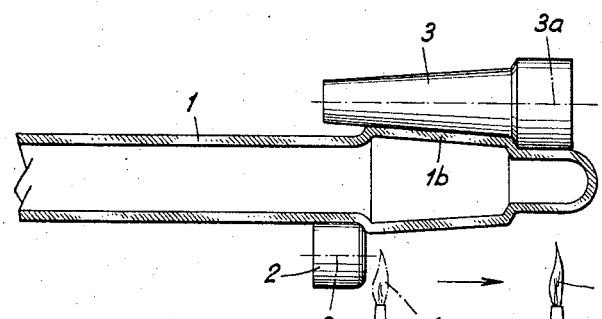
FIG. 3 is a fragmentary vertical sectional view partially in elevation of the tube of FIG. 2 with hot forming rollers in operative engagement therewith showing one stage of preforming the tube to approximately the dimensions desired.
Figure 4:
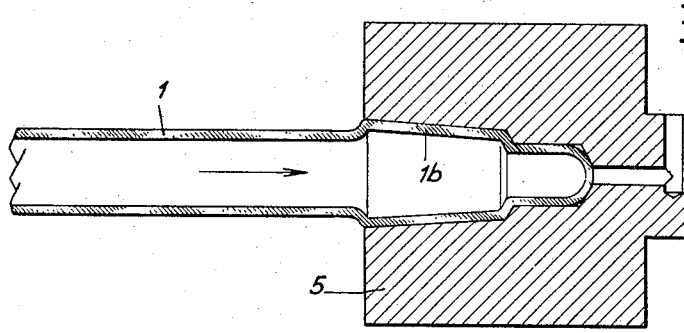
FIG. 4 is a fragmentary vertical sectional view of the preformed tube of FIG. 3 operatively positioned within an apparatus of the present invention.

The Duran 50 glass tube 1 shown in FIG. 1 is clamped very accurately with its longitudinal axis coinciding with the axis of rotation in a rotatable lathe so that it can be continuously rotated about its longitudinal axis during the whole working process, which is advisable for obtaining products of perfect quality. The front or unsupported end of the tube 1 can be closed by any known means, such as by melting to provide a sealed end, as shown in FIG. 2 wherein the sealed molten area is indicated at 1a. The end section 1b is then preformed or shaped approximately so that it is below the finally desired measurement or dimensions by an amount in the order of about 0.1 mm. The tools required for this process are indicated at 2 and 3 in FIG. 3. These tools are carbon or metal rollers which are mounted to be freely rotatable about their longitudinal axes 2a and 3a, respectively, which are preferably parallel to the longitudinal axis of the tube 1. These tools are first moved into their correct position. The roller 2 is then adjusted so that it lies in contact with the glass tube 1 while the roller 3 is gradually moved towards the tube 1 while the tube is being heat softened by means of an acetylene flame 4 which is moved backwards and forwards between the two positions 4 and 4'. At the same time, compressed air is carefully introduced at a measured rate into the inside of the tube until the end section has the conical form shown in FIG. 3. The preformed end section 1b heated to about 800° C. is then introduced into a sizing mold, such as die 5 formed, for example, of Inconel (trade mark), which is preheated to about 590° C. The die 5, like the other tools, is rotatable and mounted very accurately with its longitudinal axis coinciding with the longitudinal axis of the tube 1 and preferably rotates synchronously with the rotating glass tube. The outer surface of the preformed tubular part is urged into contact with the forming surface of the mold, preferably by again introducing compressed air into the open end of the tube 1. After the die 5 has cooled down about 50 to 70° C., which takes about 20 seconds, the article is removed from the die 5 by exerting an axial pull after the pressure within the tube 1 has been reduced to atmospheric pressure. If desired, the tube 1 is opened by cutting or melting off the tip. When the article is completely cooled, the pressure is released. A special tempering stage is not necessary.

In accordance with the foregoing embodiment of the present invention, the vitreous body or part thereof to be shaped is continuously rotated during the entire forming operation, and particularly while in contact with the mold. The rate of rotation of the vitreous body can vary considerably, and the rate will depend somewhat on the size of the body or part being formed. In the specific example, the glass tube is rotated at a substantially constant rate between about 70 and 500 r.p.m. The die 5 is also rotating, preferably synchronously with the said vitreous body, when the said body is introduced into the mold.

Two further embodiments of the present invention are of particular interest. Both of the two further embodiments differ from the first described embodiment in that the body or part thereof to be accurately shaped has at the moment of its introduction into the shaping or sizing mold a temperature below the working range. In one of said further embodiments, a preheated mold is used, while in the other embodiments the mold is brought to the initial temperature required for carrying out the process together with the parison after said parison has been introduced into the die. The latter embodiment is unsuitable for treating cylindrical or calibrating and improving bodies of tapered shapes, such as truncated cones.

The two latter embodiments are explained in detail in the following paragraphs, with reference to the temperature/time graphs (see FIG. 6, Graphs II and III) and are compared with the process of the first described embodiment (FIG. 6, Graph I), in order to elucidate the relationship. In these graphs the progress of temperature of the sizing mold is represented by a solid line and that of the parison or part of body to be formed by a broken line, the time (in seconds) being plotted on the abscissa and the temperature (in ° C.) on the ordinates. Two ranges have been emphasized on the temperature axis by oblique hatching. The lower range (480° to 600° C.) corresponds in terms of viscosity to the transformation range while the working or processing range commences at about 780° C.

It should be noted that the ranges of temperature corresponding to these viscosity ranges are dependent on the type of glass used, and that there is a characteristic correlation for each type of glass. The accompanying graphs were drawn up by way of example for apparatus glass "Duran 50" (trade mark) which is currently used. Thus, in general, it is not the temperature figures as given in the diagrams which are conclusive within the meaning of the invention, but the so called typical ranges related to the viscosity of the particular vitreous material used (compare information sheet GIT 7 (1963) No. 12 relating to "Typical Temperatures of Glass").

It should also be borne in mind that the temperatures given for the sizing tool, on the one hand, and for the parison (i.e., part of body being shaped to final size), on the other, represent assessed averages over the entire cross-section. It is obvious that, for instance, the temperature adjustment takes place almost simultaneously after the introduction of the parison in the immediate zone of contact, but will be somewhat delayed in more remote zones.

According to the process of the first described embodiment (Graph I), the parison at hte moment it comes into contact with the sizing tool (time zero) is at a temperature in the lower working or processing range of the vitreous material, while the mold is heated to a temperature in the upper transformation range of the material. After contact has been established, the parison cools primarily by giving off heat to the mold, within a relatively short period, while the temperature of the die increases accordingly till the temperature is leveled at least in the contact zone. Then, immediately follows the decisive common cooling phase of the mold and the parison, in which the sizing and/or the improving effect is brought about by the parison giving off heat to the surrounding mold and media. Following a drop in the temperature of some 50 to 70° C. from the starting temperature of the mold, the parison may be removed immediately before it becomes wedged in the mold. The moment of removal is indicated in the graph as $t_E$. As this moment is not easy to grasp and since the required effect is not attained if removal is premature, it is generally advantageous to carry on with the cooling somewhat further and to reheat the mold to enable the wedged shaping to be released.

In contrast to the process first described above and illustrated in Graph I, the body being shaped in Graph II is not preheated to a temperature in the lower processing or working range. At the moment it is introduced into the mold, i.e., at time zero, it has a temperature of about 350° C. as a result of being heated in the previous preforming stage and can readily be somewhat higher or lower, e.g., at room temperature, if sizing is not effected immediately after the preforming operation. The initial temperature of the mold at the time zero is set in this case so high that, following temperature leveling, both the parison and the mold are at a temperature of about 670° C. Then the parison and the mold are cooled simultaneously to about 570° C., whereupon reheating the mold and cooling parison makes possible the removal of the latter at time $t_E$.

The major difference between the embodiment of Graph II and the one illustrated by Graph III is that, in the latter case, the parison (i.e., the body being formed or conditioned) is introduced into the mold before the mold is heated, and is then heated together with the mold. The case illustrated is that in which the parison and the mold are at room temperature at time zero, i.e., at the moment of contact. In the case of continuous operation and immediately preceding preforming, the starting temperatures of parison and mold can, of course, be somewhat higher and need not coincide from the outset. When upon heating the mold, this and the parison have both reached the temperature of 670° C., they are cooled together until their temperature is lowered by about 100° C., whereupon reheating of the mold, accompanied by cooling of the parison, enables the latter to be readily removed at time $t_E$.

Figure 7:
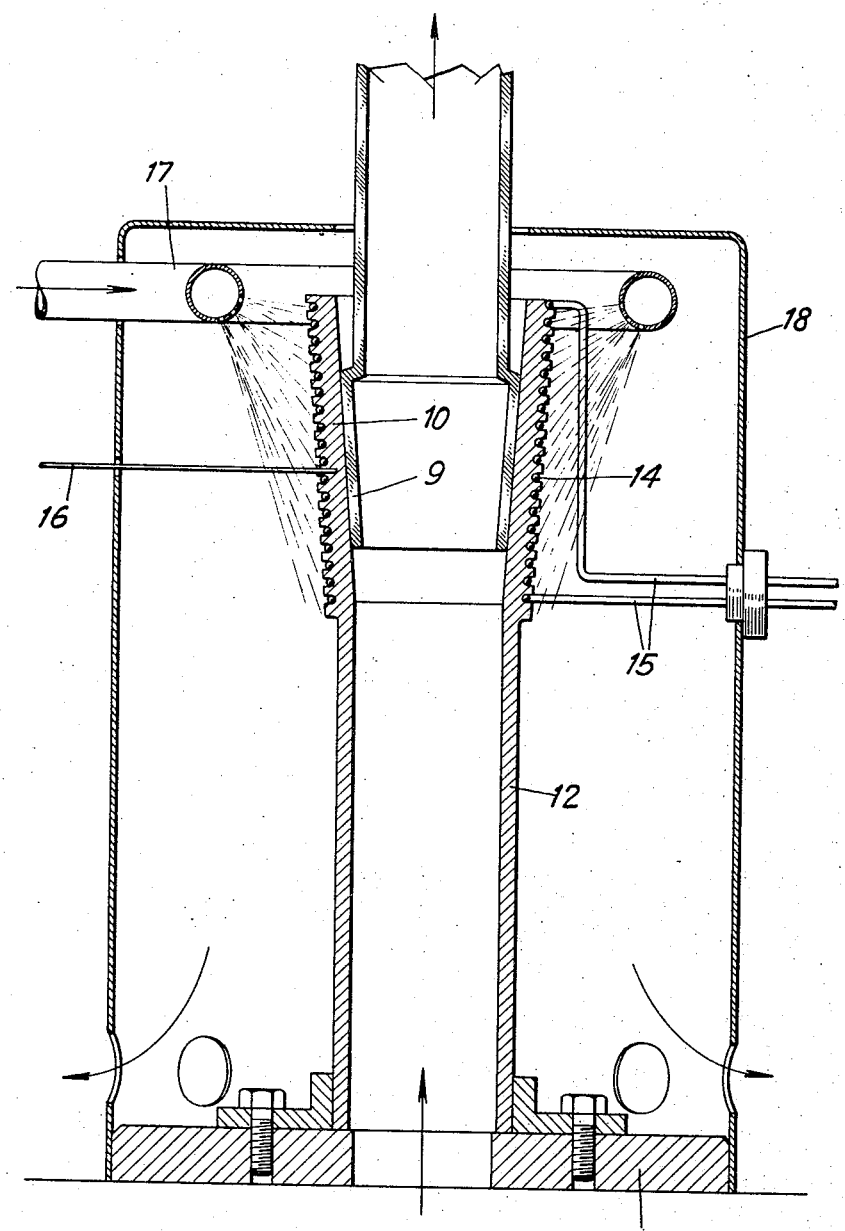
FIG. 7 is a fragmentary vertical sectional view partially in elevation of a modified apparatus of the present invention.

For carrying out the two last described embodiments, a simple device is suitable, as illustrated by way of example in FIG. 7 of the drawing as equipment for sizing and/or improving conical endings of glass tubes. The mold or die 10 is shaped as a conical socket of the nickel alloy "Inconel" (trademark) which is placed on a cylindrical tube 12, forming an extension thereof. This cylindrical tube 12 is connected to a base plate 13. The mold 10 has, in its outer lateral surface, a groove in the form of a tapering helix, in which a heating coil 14 "Thermocoax Nc" (trademark for an electrical resistance heating element) is placed for electrically heating the mold. In order to obtain satisfactory results it is important to have a uniform distribution of heat in the mold 10. This is attainable by regular arrangement of the heating coil 14, and further by using only the middle part for sizing and not the entire heated area. For certain purposes it may be desirable to have a non-uniform distribution of heat, for instance, where the calibrated shaping is to have at a certain point a slight convexity (of the order of some 0.001 mm.) or where it is intended to produce in a parison a stress zone, e.g., as a predetermined breaking point.

The heating coil 14 is fed through the two leads 15. A thermoelectric heat probe 16 is inserted at a suitable point for checking the temperature of the mold or die 10. It is possible to make use of the values it measures for the automatic control of the operations involved, such as switching the heating current on and off, introducing and removing the parison and the like.

In order to accelerate cooling of the mold or die 10 and the parison disposed therein, an annular duct 17 is provided. This duct 17 has openings directed towards the mold 10, through which openings a compressed fluid, such as air, can be blown against the mold 10. The used air escapes through holes provided in the lower part of the jacket 18. Provided it is hollow throughout and open at both ends, the parison can likewise be cooled with a compressed fluid, such as air, entering through an opening in the center of base plate 13. The parison 19 is the conical end section of a blass tube.

EXAMPLE 2

Using the equipment described above, sizing is carried out, for example, in accordance with Graph III (FIG. 6) as follows:

A parison preformed to approximately the required measurements, for example, a glass tube of "Duran 50," the conical end section 19 of which is to be externally sized, is vertically introduced at room temperature either manually or automatically from above into the mold 10 shown in FIG. 7 which is also at room temperature. Mold 10 is then electrically heated within 10 to 15 seconds to approximately 670° C., and then left to cool by approximately 100° C. with the assistance of cooling air blown in through duct 17, if desired. The mold 10 is then reheated while the shaping is cooled simultaneously, so that the end section 19 can be removed after a few seconds.

The parison to be introduced into the tool can already have the required ultimate dimensions in cases where the treatment according to the invention is intended to provide improvement in conditioning instead of sizing of the body. For example, the body of vitreous material can be hardened by using a somewhat lower or more extended cooling range than that shown in the graphs of FIG. 6. Alternatively, an inhomogeneity, for example, as a predetermined breaking point, can be introduced into the object of vitreous material by using an annular heating zone produced by a heating wire with only one single coil.

The sizing mold used in the process need not necessarily be heated by electric resistance heating. For example, it could be heated by a flame or by inductance heating. The heating and cooling periods may be shorter or longer than those indicated in the graphs of FIG. 6, depending upon the size and shape of the treated parison. For example, a solid body would generally require slower heating than a hollow parison. Its cooling, too, will take longer, especially since, in this case, internal cooling by means of compressed air is not possible. Generally speaking, the progress of temperature (extent and rate of changes in temperature) should be adapted to the size, shape and constituent material of the parison and to the desired effect. If desired, the most favorable and most rational method of operation can be readily determined by a few preliminary tests with the particular form and materials being used.

Others may practice the invention in any of the numerous ways and modifications which are obvious and suggested to one skilled in the art by this disclosure, and all such practice of the present invention are considered to be a part hereof and fall within the scope of the appended claims.

I claim:

1. A process of treating a body of vitreous material to form thereon a surface of accurate dimensions comprising: contacting an outer surface of a body section of vitreous material preformed approximately to said accurate dimensions and a continuous inner surface of a unitary metallic mold section having said accurate dimensions with said mold section having a coefficient of expansion which is different from the coefficient of expansion of said vitreous material, maintaining in close engagement said outer surface of said body section and said inner surface of said unitary mold section while said outer surface and said mold section attain a common temperature above the upper limit of the transformation range of said vitreous material, and thereafter simultaneously cooling said unitary mold section and said outer surface of said vitreous body section from said common temperature above the upper limit of said transformation range to a lower common temperature below said upper limit of said transformation range at which temperature the coefficient of expansion of said metallic mold section is higher than the coefficient of expansion of said vitreous body while said surfaces remain in said close engagement and before moving said body section and said mold section relatively out of said close engagement to subject said outer surface of said vitreous body section to high pressure while in a semi-rigid state.

2. A vitreous tubular connector member having a smooth precision shaped surface made by the process of claim 1.

3. A process as in claim 1, further characterized by said outer surface and said mold section being cooled from said common temperature which is above said transformation range and below the working range of said vitreous material to a temperature within said transformation range.

4. A process as in claim 1, further characterized by said outer surface having a temperature within the working range of said vitreous material at the moment of contact with said mold section and said mold section having a temperature within said transformation range of said vitreous material at the moment of contact with said outer surface and with said outer surface and said mold section each having a temperature such that additional heating is unnecessary to effect attainment of said common temperature above said transformation range by said outer surface and said mold section.

5. A process as in claim 1, further characterized by said body section being hollow and being preformed to exterior dimensions smaller than the said accurate dimensions, and said outer surface being brought into intimate contact wtih said inner surface of said mold section by means of gas pressure while said mold section and said body section are being rotated synchronously about a common axis.

6. A process as in claim 1, further characterized by reheating said mold section to a temperature within said transformation range above said lower common temperature to which said mold section has been cooled while in contact with said body section to facilitate removal of said body section from said mold section after said mold section has been cooled while in contact with said body section to a temperature below the upper limit of said transformation range.

7. A process as in claim 1, wherein both said sections are heated from a temperature below said upper limit of said transformation range to said common temperature which is above the upper limit of said transformation range and below the lower limit of said working range while maintaining said mold section and said outer surface in said close engagement.

8. An apparatus for treating a body of vitreous material to form thereon a surface of accurate dimensions comprising, a unitary metal mold with an axial passage connecting the opposite ends and extending through the interior thereof having a continuous inner surface of accurate dimensions which has a contact zone intermediate the ends thereof for engaging an outer surface of a body of vitreous material having approximately said accurate dimensions, and heating means associated with said unitary metal mold extending the axial length of said contact zone and axially beyond the opposite ends thereof for effecting controlled uniform heating of said mold in said contact zone to a temperature above the upper limit of the transformation range of said vitreous material.

9. An apparatus as in claim 8, wherein said mold comprises a tapered tubular section mounted vertically on a tubular member and said tubular member being substantially unobstructed to permit introducing a cooling fluid axially therein.

References Cited

UNITED STATES PATENTS

| 1,756,813 | 4/1930 | Canfield | 65—230 |
| 1,949,899 | 3/1934 | Collins et al. | 65—82 |
| 2,725,683 | 12/1955 | Lockhart | 65—82 |

DONALL H. SYLVESTER, *Primary Examiner.*

G. R. MYERS, R. L. LINDSAY, *Assistant Examiners.*